United States Patent
Tian et al.

(10) Patent No.: US 10,348,362 B2
(45) Date of Patent: Jul. 9, 2019

(54) METHODS AND SYSTEMS FOR FUSION AND INFERENCE WITH PER-HOP LINK QUALITY MEASUREMENTS IN FREQUENCY HOPPING SATCOM SYSTEMS

(71) Applicant: Intelligent Fusion Technology, Inc., Germantown, MD (US)

(72) Inventors: Xin Tian, Germantown, MD (US); Genshe Chen, Germantown, MD (US); Khanh Pham, Kirtland AFB, MN (US); Erik Blasch, Arlington, VA (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 0 days.

(21) Appl. No.: 16/169,640

(22) Filed: Oct. 24, 2018

(65) Prior Publication Data

US 2019/0123780 A1    Apr. 25, 2019

Related U.S. Application Data

(60) Provisional application No. 62/576,199, filed on Oct. 24, 2017.

(51) Int. Cl.
| | |
|---|---|
| *H04B 1/71* | (2011.01) |
| *H04B 1/719* | (2011.01) |
| *H04B 17/318* | (2015.01) |
| *H04B 17/345* | (2015.01) |
| *H04B 1/715* | (2011.01) |
| *H04B 7/185* | (2006.01) |
| *H04B 1/7156* | (2011.01) |

(52) U.S. Cl.
CPC ............. *H04B 1/719* (2013.01); *H04B 1/715* (2013.01); *H04B 1/7156* (2013.01); *H04B 7/18506* (2013.01); *H04B 7/18513* (2013.01); *H04B 17/318* (2015.01); *H04B 17/345* (2015.01); *H04B 2001/7152* (2013.01); *H04B 2001/71566* (2013.01)

(58) Field of Classification Search
CPC .... H04B 1/719; H04B 17/318; H04B 17/345; H04B 1/7156; H04B 1/715; H04B 7/18506; H04B 7/18513
See application file for complete search history.

(56) References Cited

U.S. PATENT DOCUMENTS

| | | | | |
|---|---|---|---|---|
| 2015/0071235 A1* | 3/2015 | Chatterjee | ............... | H04W 4/70 370/329 |
| 2015/0312908 A1* | 10/2015 | Sorrentino | .......... | H04W 72/082 370/336 |

* cited by examiner

*Primary Examiner* — Kabir A Timory
(74) *Attorney, Agent, or Firm* — Anova Law Group, PLLC

(57) ABSTRACT

The present disclosure provides a method for fusion and inference with per-hop link quality measurements in frequency hopping satellite communication (SATCOM) systems. The method includes: grouping hops having a same SATCOM link set into one hop group such that the one hop group contains a plurality of same SATCOM link sets; grouping the measurement sets into one or more first measurement groups, based on a link identification; in the each first measurement group having the same link identification, further grouping the measurement sets having a same range of the signal amplitude measurements into one or more second measurement groups; obtaining interference conditions by associating second measurement groups of all links in each hop group based on hop identifications belonging to the second measurement groups.

20 Claims, 8 Drawing Sheets

METHODS AND SYSTEMS FOR FUSION AND INFERENCE WITH PER-HOP LINK QUALITY MEASUREMENTS IN FREQUENCY HOPPING SATCOM SYSTEMS

CROSS-REFERENCES TO RELATED APPLICATION

This application claims the priority of Provisional Application 62/576,199, filed on Oct. 24, 2017, the content of which is incorporated by reference in its entirety.

GOVERNMENT RIGHTS

This invention was made with Government support under Contract No. FA9453-15-C-0401, awarded by the United States Air Force Research Laboratory. The U.S. Government has certain rights in the present disclosure.

TECHNICAL FIELD

The present disclosure generally relates to the field of information processing technology, and more particularly, relates to methods and systems for signal fusion and inference with per-hop link quality measurements in frequency hopping satellite communication (SATCOM) systems.

BACKGROUND

Uncertainties are inherent in communication systems and especially significant in satellite communication (SATCOM) systems where signal losses exist from all sources along the path of a SATCOM link, e.g., atmospheric attenuation, antenna depointing loss, and channel noise. To manage uncertainties in SATCOM, a common approach is to reserve a sufficient amount of link margin (LM) so that the receiver side signal-to-noise ratio (SNR) is above the required level. For example, a SATCOM waveform with a probability that is larger than a desired (link availability) threshold, e.g., 99%. The problem is more challenging in transponded SATCOM systems where each SATCOM link consists of two segments, i.e., the uplink and the downlink; where multiple SATCOM links and interference are further coupled through the transponder. As a result, the transponded SATCOM link budget plan needs to account for uncertainties from losses in the uplink segment (power robbing effects in the transponder), as well as losses in the downlink segment, such that the overall transponded link SNR or CNR (carrier power to noise density ratio) meets the required threshold level with desired probabilities.

One approach to deal with uncertainties is that the SATCOM link margins can be reserved based on prior knowledge at fixed levels, e.g., 3 dB, regardless of the real-time radio frequency (RF) environment, which leads to energy waste and unused system capacity (multi-user case) in good conditioned (stable link losses with little variation) environments. Another approach, for non-Hopping SATCOM system, is that the SATCOM receiver can obtain link quality (SNR) measurements that can be used to dynamically adjust the terminal transmission power level and link margin.

In Frequency Hopping (FH) SATCOM systems, the basic approach for RF situation awareness is to obtain average SNR measurements over many hops, which provide a coarse estimation of overall SATCOM link qualities. However, more sophisticated per-Hop SNR estimation and information fusion can be used to provide detailed channel quality information, such as interference information in support of Dynamic Resource Allocation (DRA) (including waveform selection and power control).

Accordingly, it is desirable to provide methods, systems and media for RF situation awareness using per-Hop measurements of SATCOM links in a FH SATCOM system to provide detailed SATCOM link quality information, and interference information.

BRIEF SUMMARY

An aspect of the present disclosure provides a method for fusion and inference with per-hop link quality measurements in frequency hopping satellite communication (SATCOM) systems. The method includes: grouping hops having a same SATCOM link set into one hop group such that the one hop group contains a plurality of same SATCOM link sets, wherein each hop corresponds to one SATCOM link set, containing one or more SATCOM links, being active thereover; measuring each SATCOM link to provide a measurement set, the measurement set including a signal amplitude measurement and a link noise level measurement; grouping the measurement sets into one or more first measurement groups, based on a link identification, wherein each first measurement group includes a same link identification from different hops within a same hop group; in the each first measurement group having the same link identification, further grouping the measurement sets having a same range of the signal amplitude measurements into one or more second measurement groups, wherein the signal amplitude measurements in the same range have a fused signal level measurement; and obtaining interference conditions by associating second measurement groups of all links in each hop group based on hop identifications belonging to the second measurement groups, wherein the interference condition includes one second measurement group with a fused signal amplitude for each link corresponding to each hop group.

In some embodiments, the method further comprises: for each interference condition, grouping the measurement sets having a same range of the link noise level measurement into one or more third measurement groups, and obtaining a fused noise level for each third measurement group.

In some embodiments, the method further comprises: determining a noise floor estimate of the interference condition as a minimum fused noise level among third measurement groups of the interference condition (Note other requirement may be enforced on a fused noise level from a third measurement group to be the noise floor of an interference condition, which include number of measurement sets in the third measurement group should be above a threshold).

In some embodiments, the method further comprises receiving, from hub receiver, hub receiver noise level estimate with an associated accuracy estimate.

In some embodiments, the method further comprises obtaining estimates of uplink carrier power to noise power spectrum density ratios of each link under the interference condition using the fused signal amplitude estimates of the second measurement group of a link of the interference condition, a noise floor estimate of the interference condition, and the hub receiver noise level estimate, i.e., results from previous embodiments.

In some embodiments, the method further comprises receiving total downlink carrier power to noise power spectrum density ratios.

In some embodiments, the method further comprises obtaining interference strength estimate of the interference condition.

In some embodiments, the method further comprises counting a total number of hops associated with the interference condition; and dividing the hops by the total number of hops to derive appearance rate of the interference condition.

In some embodiments, the method further comprises obtaining a rate of the SATCOM links encountering interference band under the interference condition.

In some embodiments, each of the measurement set further includes: an associated measurement accuracy of the signal amplitude measurement, being a standard deviation of the signal amplitude measurement; and an associated measurement accuracy of the link noise level measurement, being a standard deviation of the link noise level measurement.

Another aspect of the present disclosure provides a system for fusion and inference with per-hop link quality measurements in frequency hopping satellite communication (SATCOM) systems. The system comprises: a hardware processor; and a memory storing instructions that, when executed by the hardware processor, cause the hardware processor to: group hops having a same SATCOM link set into one hop group such that the one hop group contains a plurality of same SATCOM link sets, wherein each hop corresponds to one SATCOM link set, containing one or more SATCOM links, being active there-over; measure each SATCOM link to provide a measurement set, the measurement set including a signal amplitude measurement and a link noise level measurement; group the measurement sets into one or more first measurement groups, based on a link identification, wherein each first measurement group includes a same link identification from different hops within a same hop group; in the each first measurement group having the same link identification, further group the measurement sets having a same range of the signal amplitude measurements into one or more second measurement groups, wherein the signal amplitude measurements in the same range have a fused signal level measurement; and obtain interference conditions by associating second measurement groups of all links in each hop group based on hop identifications belonging to the second measurement groups, wherein the interference condition includes one second measurement group with a fused signal amplitude for each link corresponding to each hop group.

Other aspects of the present disclosure can be understood by those skilled in the art in light of the description, the claims, and the drawings of the present disclosure.

BRIEF DESCRIPTION OF THE DRAWINGS

Various objects, features, and advantages of the present disclosure can be more fully appreciated with reference to the following detailed description of the present disclosure when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

For those skilled in the art to better understand the technical solution of the present disclosure, reference will now be made in detail to exemplary embodiments of the present disclosure, which are illustrated in the accompanying drawings. Wherever possible, the same reference numbers will be used throughout the drawings to refer to the same or like parts.

In a SATCOM system, Dynamic Resource Allocation (DRA) determines for all satellite links in the system their communication waveform, transmission powers, etc, so that SATCOM link Quality of Service (QoS) requirements, such as link throughput, bit error rate, delay, etc. can be best met. For effective DRA, in a SATCOM system, RF situation awareness, which provide SATCOM link quality estimates and interference information, is crucial. Good SATCOM DRA decisions can only be made based on sufficient information of the RF environment. Accordingly, link quality measurements from a group of SATCOM links can be used to derive sophisticated RF environment information of the whole spectrum band. In addition, multiple SATCOM return links are coupled when they share the same transponder amplifier. As a result, the measurements from all the coupled links through a same transponder can be used to derive the desired RF situation awareness information over the spectrum band covered by the transponder amplifier.

Multi-entity Bayesian Networks (MEBN) provide a framework for modeling probabilistic dependency among various nodes (entities). In general, the probabilistic dependency of a node to its parent nodes is encoded in the conditional probability table (CPT) of the node, which forms an mFrag—the parameterized block of a larger fragment of the Bayesian network that is composed on uncertain relationships among m related hypothesis. Multiple mFrags can be further connected to build a Multi-entity Bayesian Network (MEBN) that support information fusion and inference. Inference in MEBN is accomplished using fast Junction Tree algorithm and does not need closed form expressions for the distributions for the nodes. For the problem of RF situation awareness in transponded SATCOM system, the MEBN provides a general tool for information fusion, inference assessment, and uncertainty handling.

Figure 1:
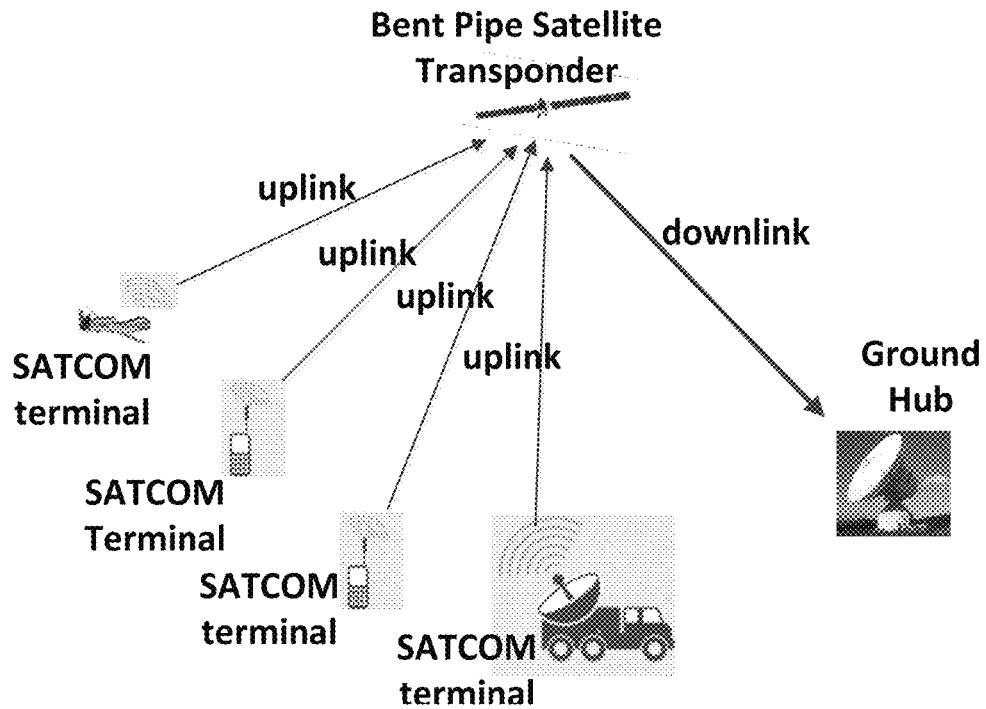
FIG. 1 illustrates a schematic flow diagram illustrating an exemplary scenario of a trasnponded SATCOM system in accordance with some embodiments of the present disclosure.

An illustrative scenario of a transponded SATCOM system is shown in FIG. 1, which consists of a SATCOM ground Hub, multiple remote SATCOM terminals, and a satellite bent pipe transponder. The transponded SATCOM system includes return links (RLs), which are the links from the terminal to the SATCOM Hub through the satellite transponder. The proposed algorithm can also be applied for forward links (FLs, links from the Hub to the terminals through the transponder). Each return link consists of two segments. The first segment is the uplink (from the SATCOM terminal to the satellite transponder). The second segment is the downlink (from the satellite transponder to the ground hub). The bent pipe transponder does not demodulate and decode the uplink signals. The bent pipe simply amplifies the uplink signal and sends it back to the ground hub using the SATCOM downlink.

Figure 2:
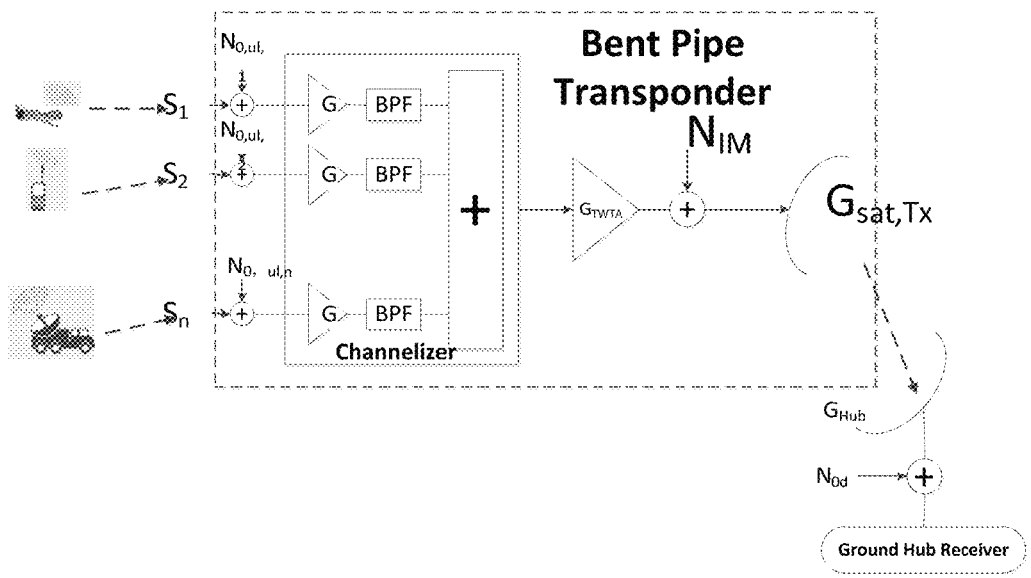
FIG. 2 illustrate an exemplary diagram of Multiple SATCOM return links (RL) from SATCOM terminals to a Ground Hub through a bent pipe transponder in accordance with some embodiments of the present disclosure.

FIG. 2 shows the functional diagram of the return link with function modules of the bent pipe transponder. At the bent pipe transponder, the uplink signals from the SATCOM terminals plus transponder receiver noise are first amplified and passed through Band Pass Filters (BPF) to reduce outband noises. Then the channelizer at the transponder rearranges and combines frequency bands for the SATCOM links. The combined signal is then amplified with a Travelling Wave Tube Amplifier (TWTA), which may introduce intermodulation noise ($N_{IM}$) when the TWTA operates in a nonlinear region. After the amplification, the combined downlink signal is sent through the SATCOM downlink to the ground hub.

Figure 3:
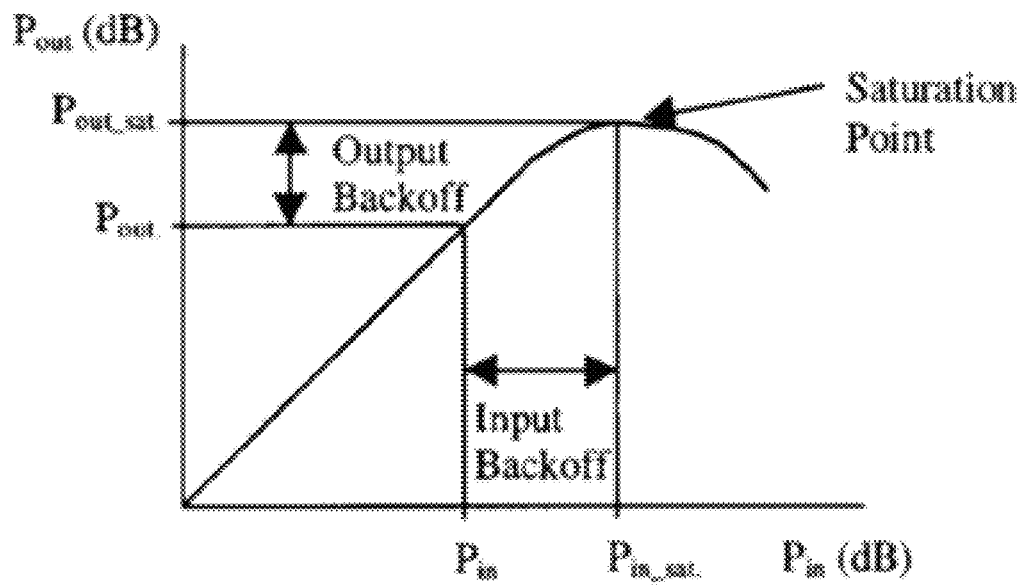
FIG. 3 illustrates schematic diagrams of exemplary input-output power relationship of a Bent Pipe Transponder power amplifier module in accordance with some embodiments of the present disclosure.
Figure 4:
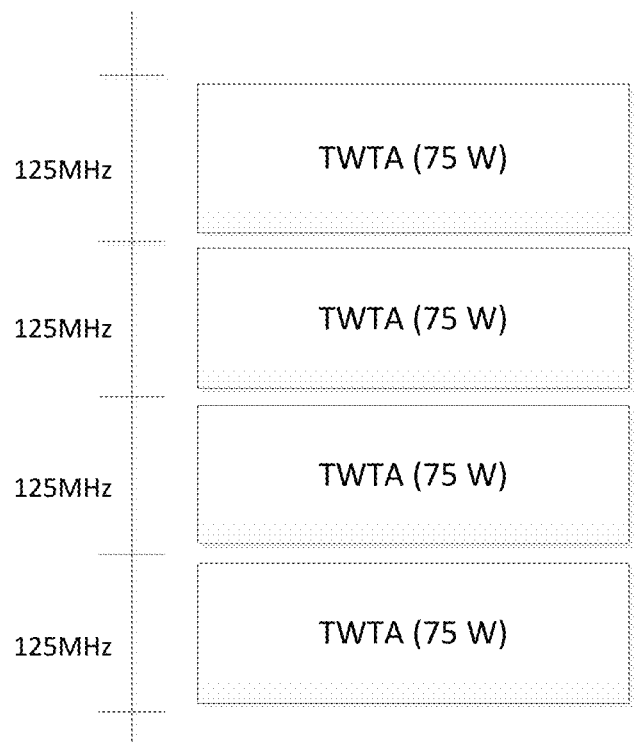
FIG. 4 illustrates schematic diagrams illustrating exemplary Satellite transponder power Amplifiers' spectrum band overage arrangement in accordance with some embodiments of the present disclosure.

The total input power to the TWTA is given by $$P_{in} = G\Sigma_{i=1}^{N}\{S_i + N_i\} \quad (1)$$

where G is the transponder gain, $S_i$ is the uplink signal input to the transponder and $N_i = N_{0,u,i} W_i$ is the passband noise power with each SATCOM link and $W_i$ is the channel bandwidth. The intermodulation (IM) noise, $N_{IM}$, power is $$N_{IM} = NPR * P_{NOP} \quad (2)$$

where $P_{NOP} = G_{TWTA} P_{in}$ is the transponder TWTA's nominal operating point (NOP) and NPR is the transponder Noise Power Ratio. The typical satellite TWTA operational characteristics are shown in FIG. 3. When the transponder is operating in a nonlinear region close to the saturation point, the output will be corrupted by intermodulation noises as $$P_{out} = G_{TWTA} P_{in} + N_{IM}, \text{ s.t. } P_{out} < P_{out\_sat} \quad (3)$$

With Automatic Level Control (ALC), the transponder gain G is selected such that the transponder works in a linear region, where $N_{IM}$ is very low compared to the signal levels.

For a transponded SATCOM return link, the combined carrier to noise power density ratio C/No (denoted as C2No to avoid possible confusions with division operator "/"in equations) level at the Hub receiver is given by $$C2No_{h,i}^{-1} = C2No_{u,i}^{-1} + C2No_{IM,i}^{-1} + C2No_{d,i}^{-1} \quad (4)$$

where $C2No_{h,i}$ denotes the combined SATCOM link C/No level at the ground hub receiver, $C2No_{u,i}$ is the uplink C/No level $C2No_{d,i}$ is the downlink C/No level at the hub receiver for link i; and $C2No_{IM}$ denotes the signal to intermodulation noise density ratio.

The above presented transponder model (Eq 4) assumes that there is only one transponder amplifier for the SATCOM downlink. In real world cases, a satellite transponder may use multiple transponder amplifiers (TWTAs) to cover a wide range of downlink spectrum bands.

Error! Reference source not found. 4 shows an example case with 4 TWTA in a SATCOM transponder covering a 500 MHz bandwidth. Denote the transponder amplifier as $TWTA_t$, t=1, 2, 3, 4 . . . . At a given period of time, corresponding to hop if in a FH SATCOM system, there may be zero, one or multiple links passing through a transponder amplifier. To denote the links passing through a transponder amplifier at a certain time period, notation $TWTA_i$(linkid1, linkid2, . . . ) is used, where $TWTA_i$ denote the transponder amplifier and linkid1, linkid2 . . . are the links passing through the transponder amplifier. For example $TWTA_1(1,3)$ denotes that link 1 and 3 passing through TWTA 1 at the time period.

At each transponder's band, the uplink interference can be categorized as two types. Note that uplink interference is the major source of interference of consideration. The first type of uplink interference is persistent interference which is always present as uplink interference at the SATCOM transponder receiver. The second type of uplink interference is transient, which is present in some time period and is absent in other time period.

Denote the persistent interference plus noise to noise density ratio over spectrum band covered by $TWTA_t$ as C2Nu,t(N,I)*, which is an equivalent (total) interference and noise power to noise power spectrum density ratio of the transponder's receiver over the $TWTA_t$'s spectrum band.

In a frequency hopping transponded SATCOM system, each hop is a small, fixed-length time period that is used to transmit communication symbols.

At the receiver side, using received symbols over a hop, the following per-hop estimates for each SATCOM link can be obtained.

Figure 5:
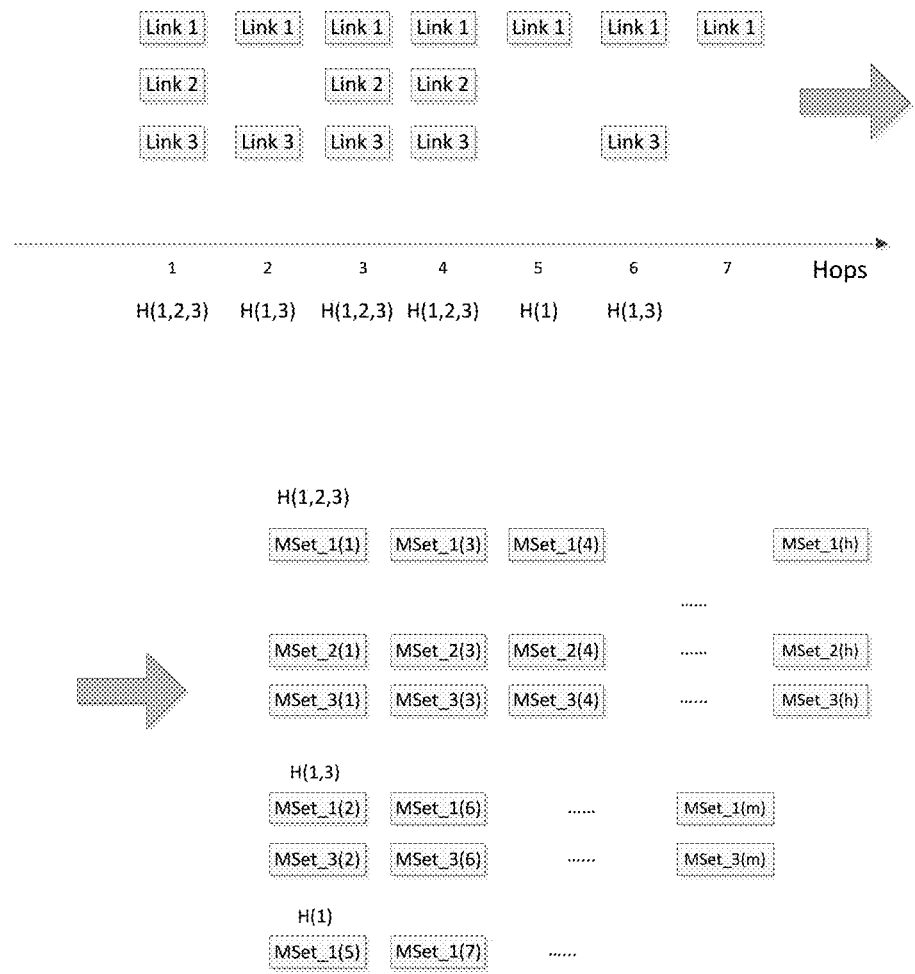
FIG. 5 illustrates schematic diagrams illustrating exemplary frequency hop grouping and measurement set grouping in accordance with some embodiments of the present disclosure.
Figure 9A:
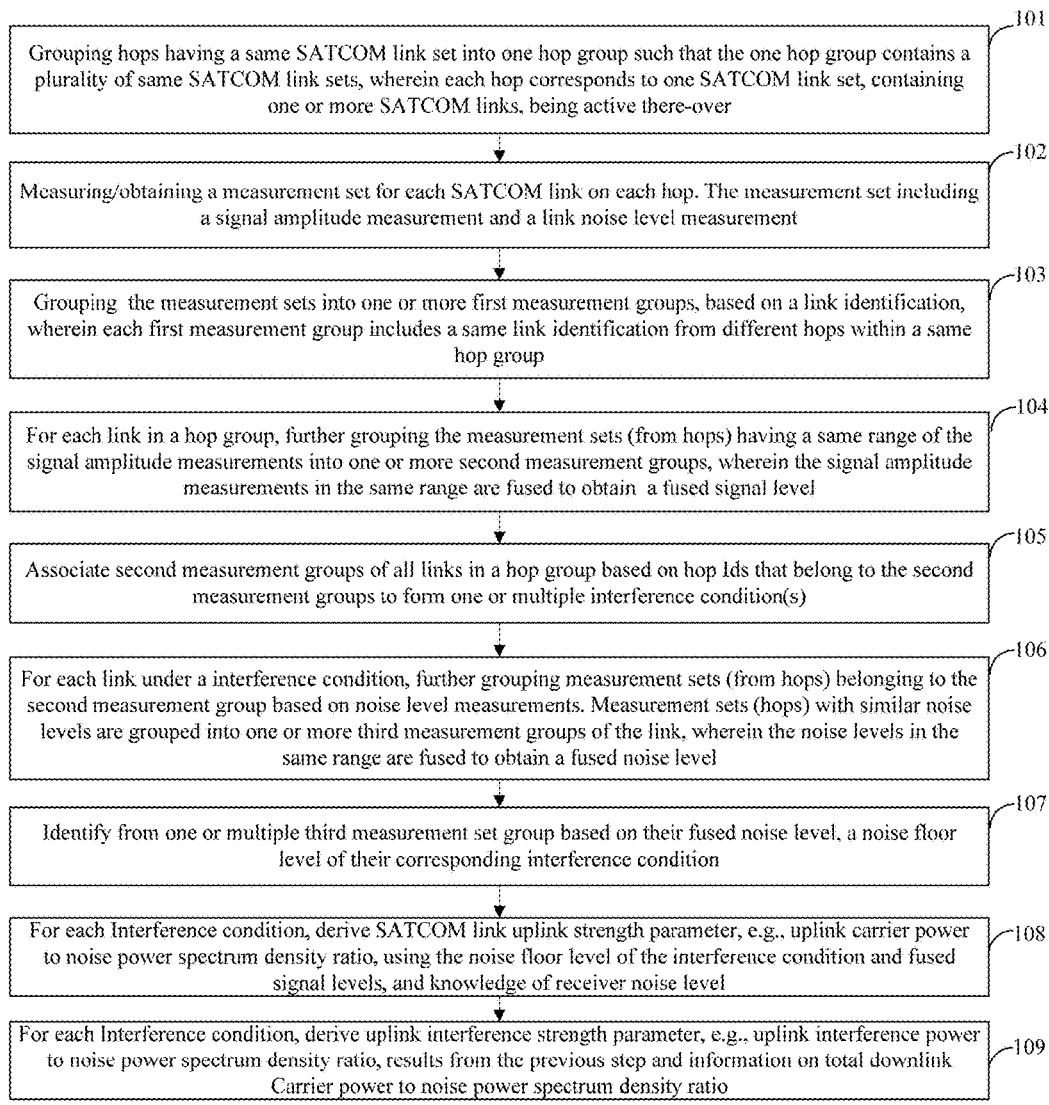
FIG. 9A illustrates schematic flow diagram illustrating an exemplary process method for signal fusion and inference with per-hop link quality measurements in frequency hopping satellite communication (SATCOM) systems in accordance with some embodiments of the present disclosure.

As shown in FIG. 5, a plurality of SATCOM links may have link identification(id) 1, 2, 3, . . . N. There are some active SATCOM links over each hop. The hops are grouped with the same set of SATCOM links to hop's link sets and the hop's link sets are denoted as H(i, j, k) at step 101 as illustrated in FIG. 9A. For example, when link 1, 2 are active over a hop, the hop's link set is denoted as H(1, 2); when only link 1 is active over a hop, the hop's link set is denoted as H(1), etc.

Each hop's link set H(i, j, k, . . . ) has one or multiple links, i, j, . . . . Each link, e.g., link i, has a link hop measurement set denoted as Mset_i(h) after step 102 as illustrated in FIG. 9A, i is the link id and h is the hop id.

The measurement set for a SATCOM link, e.g., link i, Mset_i(h) includes: signal amplitude measurement Ae_i(h) and associated measurement accuracy given by e.g., standard deviation Aesd_i(h), and h is the hop id; and link noise level measurements Noh_i(h) and associated measurement accuracy given by e.g., standard deviation Nohsd_i(h).

Figure 6:
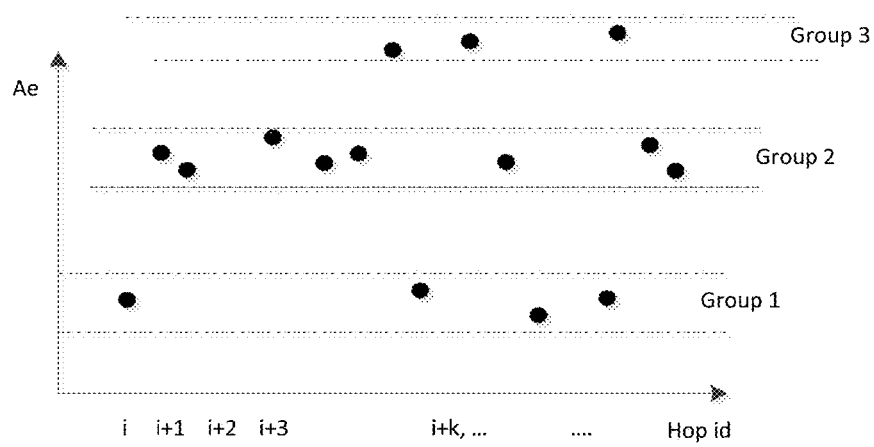
FIG. 6 illustrates schematic diagrams illustrating exemplary measurement set grouping based on signal amplitude measurement in accordance with some embodiments of the present disclosure.

For each SATCOM link, e.g., link i, within the same hop group H(i, j, k), the link's Ae_i(h) and Noh_i(h) estimates are processed by grouping them based on their levels as shown in FIG. 6 and step 103 in FIG. 9A. The same grouping processing shall be done for other links, e.g., j, k in the same hop group.

Figure 7:
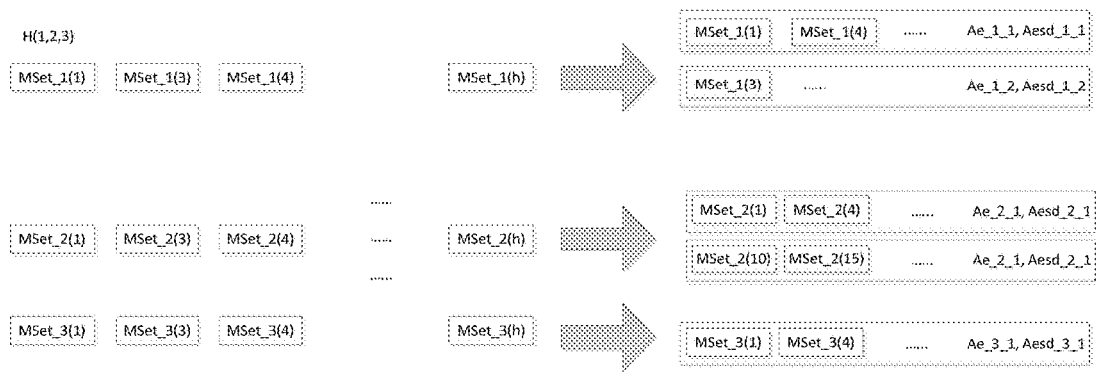
FIG. 7 illustrates schematic diagrams illustrating exemplary measurement set grouping based on signal amplitude measurement in accordance with some embodiments of the present disclosure.

As shown in FIG. 7 and step 104 in FIG. 9A, within a link set H(i, j, k), for each link, group per-hop measurement sets for the link, e.g., i, Mset_i(h) based on the signal amplitude measurement, e.g., Ae_i(h). Measurement sets for links with similar levels of Ae_i(h) are fused together. The fusion of a group of signal amplitude estimates that has similar levels leads to a fused signal amplitude estimate with improved accuracy. When there are multiple groups of Ae estimates as illustrated in FIG. 7, this results in a number of fused levels for the link signal amplitude.

For example, amplitude level 1 for link 1, has a fused value of Ae_1_1 and fused accuracy, e.g., standard deviation of Aesd_1_1. This fused Ae_1 level is derived from a set of link 1 measurement set consisting of, e.g., Mset_1(1), Mset_1(4), . . .

Ae_i estimates for a SATCOM link i within the same group are combined to get a fused Ae_i_k estimate with improved accuracy, Aesd_i_k, where k is the fused Ae_i level index.

Ae estimates of all links, e.g., Ae_1_1, Ae2_m, Ae3_n, within a link set H(i, j, k) are further grouped based on their associated hop ids as shown at step 105 in FIG. 9A. For example, if Ae_1_1, Ae2_m, Ae3_n, are derived from groups of measurement sets with similar hop ids. For example, if Ae1_1: {MSet_1(1) MSet_1(4) . . . }, Ae2_m: {MSet_2(1) MSet_2(4) . . . }, Ae3_n: {MSet_3(1) MSet_3 (4) . . . } are all from hops {1, 4, . . . }, they may be grouped together. Such a group of fused signal amplitude estimates corresponds to an interference condition denoted as IC: {Ae_1_1, Ae_2_m, Ae_3_n}. At step 106 in FIG. 9A, the interference condition corresponding to the grouped fused signal amplitude measurement of each hop are obtained and displayed.

The grouping of signal amplitude estimates (or noise level estimates) are achieved by a fusion/clustering algorithm that determines which estimates belong to a same range and fuse them together to obtain a fused estimate for the range.

Figure 8:
FIG. 8 illustrates schematic diagrams illustrating exemplary measurement set grouping based on noise level measurement in accordance with some embodiments of the present disclosure.

For each fused Ae_i_1 level e.g., Ae_1_1, derived from a group of link measurement sets, the link measurement sets are further grouped and fuses based on the noise level estimates Noh_i in the measurement set for a link i. As shown in FIG. 8 and step 106 in FIG. 9A, one or multiple noise levels, e.g., Noh_1_1_1 and their associated fused accuracy, e.g., standard deviation Nohsd_1_1_1 may be derived. Each level is further associated with a group of link measurement set.

The minimum level of noise level estimates, e.g., Noh_1_1*=Noh_1_1_1, may be derived from the noise level estimates. The minimum level of noise level estimates corresponds to noise level when there is no interference overlapping with signal band. Note that requirements on the minimum fused noise level can be added to avoid choosing of the few outlier noise level evaluation as the minimum noise level. Such requirements include requiring the number of hops used to derive the fused noise level to be greater than a number, etc.

The minimum level of noise level estimates extends the interference condition as: IC: {Ae_1_1, Noh_1_1* , Ae_2_m, Noh_2_m*, Ae_3_n, Noh_3_n*} at step 107 in FIG. 9A. Theoretically Noh_1_1*, Noh_2_m*, Noh_3_n* should have the same true value. As a result, they may be further fused to obtain a fused noise level for the interference condition as Noh_IC*, and the interference condition is denoted as, e.g., IC: {Ae_1_1, Ae_2_m, Ae_3_n, Noh_IC*}.

Hub receiver may also provide receiver noise level estimate as Nod with associated accuracy estimate, e.g., standard deviation Nodsd, jointly denoted as {Nod, Nodsd}

Figure 10:
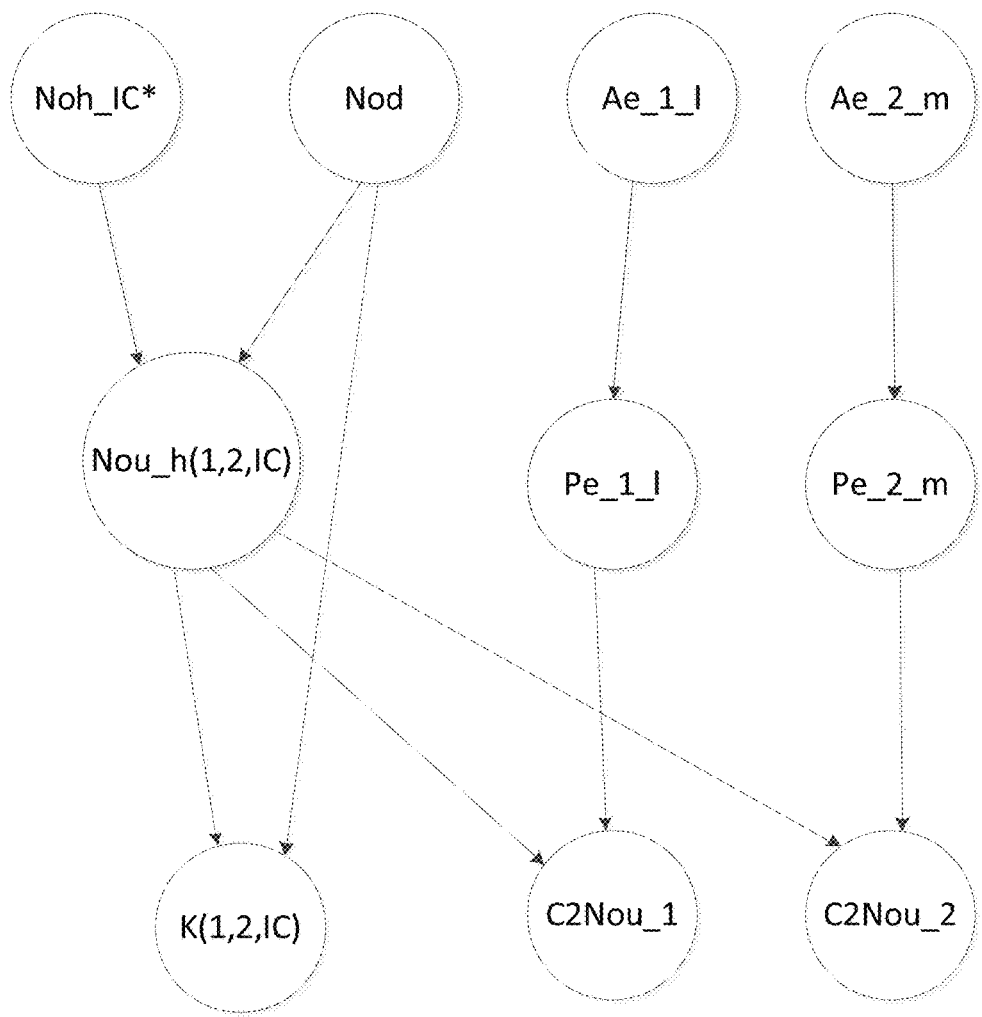
FIG. 10 illustrates schematic diagrams of exemplary Type I information fusion SATCOM RF situation awareness in accordance with some embodiments of the present disclosure.

Based on the interference condition, e.g., IC: {Ae_1_1, Ae_2_m, Ae_3_n, Noh_IC*} and the receiver noise level estimate {Nod, Nodsd}, SATCOM uplink SNR, e.g., SATCOM uplink carrier power to noise power spectrum density ratio, i.e., C2Nou_i may be derived at step 108 in FIG. 9A. For example, using MEBN for type I information fusion for SATCOM RF situation awareness as shown in FIG. 10. The C2No extends the information set for the interference condition with uplink C2Nou_i, denoted as, e.g., IC: {Ae_1_1, Ae_2_m, Ae_3_n, Noh_IC*, C2Nou_1, C2Nou_2, C2Nou_3}.

Hub receiver may also provide total downlink carrier power to noise power spectrum density ratio, e.g., C2Nod_total estimate and associated accuracy measure, e.g., standard deviation as {C2Nod_total, C2Nod_total_sd}.

Figure 11:
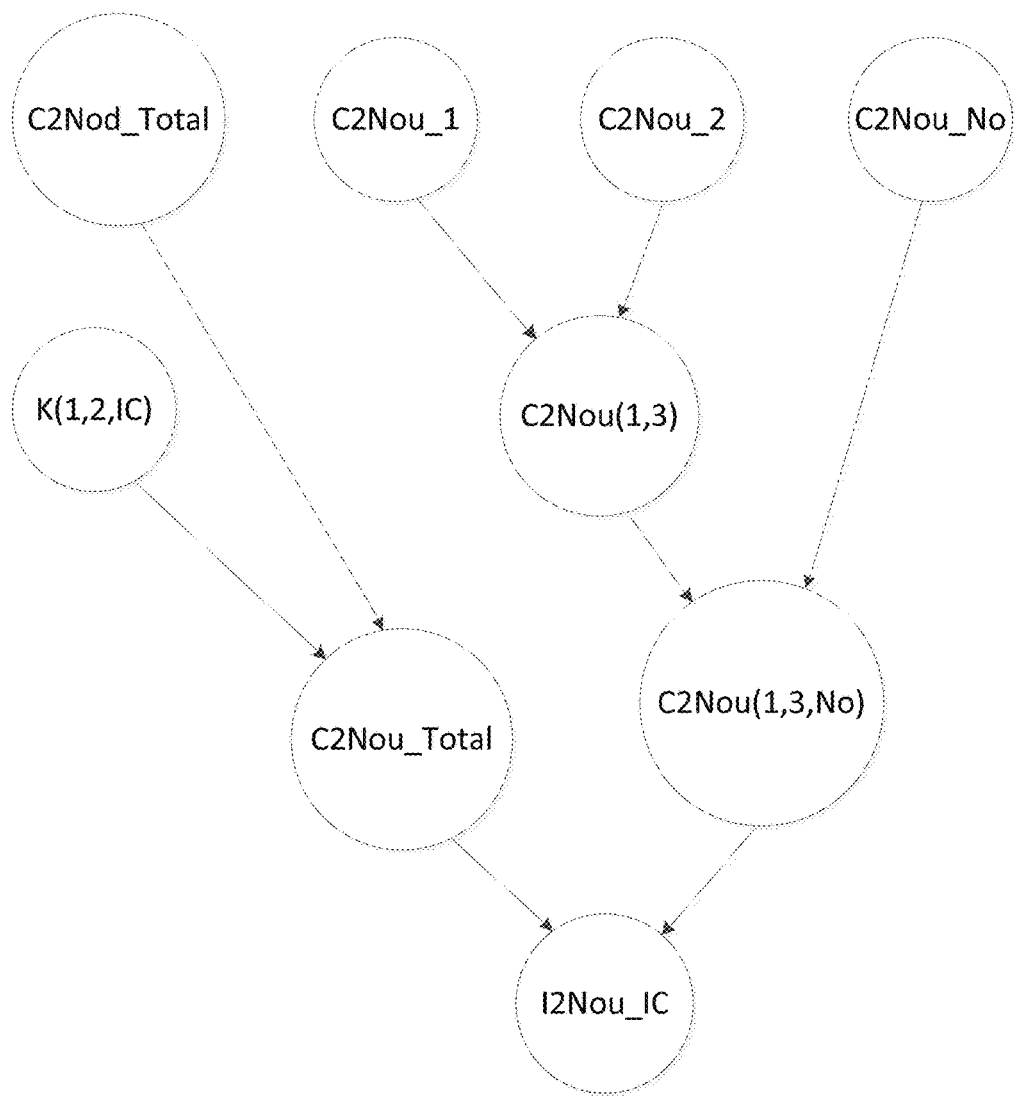
FIG. 11 illustrates schematic diagrams of exemplary type II information fusion SATCOM RF situation awareness in accordance with some embodiments of the present disclosure.

Based on the interference condition with uplink C2Nou_i and the total downlink carrier power to noise power spectrum density ratio interference strength estimate, strength estimate, e.g., I2No_IC for the interference condition may be derived at step 109 in FIG. 9A. For example using MEBN for type II inference fusion as shown in FIG. 11. The information set for the interference condition with uplink I2Nou is further extended, denoted as, e.g., IC: {Ae_1_1, Ae_2_m, Ae_3_n, Noh_IC*, C2Nou_1, C2Nou_2, C2Nou_3, I2Nou_IC}. Note that an input for MEBN for type III information fusion is the estimate of coefficient K for the interference condition. The estimate of the coefficient K is available from type I information fusion as mapping ratio, e.g., K(1,2,IC), between uplink SNR and downlink SNR under the interference condition (IC) as shown in Equation 7.

For each interference condition IC within a link set H(i, j, k), estimates for SATCOM link SNR, as C2Nou_i, i=1, . . . , N and uplink interference strength I2Nou_j are derived, and j is the index of the interference condition. By counting the hops associated with the interference condition and dividing the hops by the total number of hops, appearance rate of the interference condition, denoted as R_IC can be derived. The IC information set is further extended, as IC: {Ae_1_1, Ae_2_m, Ae_3_n, Noh_IC*, C2Nou_1, C2Nou_2, C2Nou_3, I2Nou_IC, R_IC}.

For each link under an interference condition IC, a fused noise level also shows which grouping steps have increased noise floor level due to the overlapping between the interference band and the link's signal band. As a result, the rate of a SATCOM link i encountering interference band under the interference condition, denoted as RIen_i may be derived. The interference condition information set is further extended as e.g., IC: {Ae_1_1, Ae_2_m, Ae_3_n, Noh_IC*, C2Nou_1, C2Nou_2, C2Nou_3, I2Nou_IC, R_IC, RIen_1, RIen_2, RIen_3}.

After grouping of the SATCOM hops with link groups H(i, j, k . . . ) and the fusing of the per-hop link measurement sets with in a link group to derive fused interference conditions IC: {Ae_1_1, Ae_2_m, Ae_3_n}, and interference condition with noise features IC: {Ae_1_1, Noh_1_1* , Ae_2_m, Noh_2_m*, Ae_3_n, Noh_3_n*}, and interference condition with fused noise feature IC: {Ae_1_1, Ae_2_m, Ae_3_n, Noh_IC*}, SATCOM link quality in terms of uplink carrier power to noise power spectrum density (psd) ratio C2Nou_i, and interference strength under the interference condition in terms of interference power to noise psd ratio, denoted as I2Nou can be derived.

The derived estimates on SATCOM link quality represented by C2Nou i=1, 2, . . . , interference strength as I2Nou_j under various interference conditions, and the presence rate of different interference conditions can be used to support Dynamic Resource Allocation (DRA) in the SATCOM system. Such information is derived by a processor processing per-hop link quality measurements from the hub receiver with the proposed grouping and signal fusion approach. The derived information is provided to a DRA controller of the SATCOM system, which uses the information and other additional information to determine the waveforms of the SATCOM links, transmission power level that should be used by transmitters, etc. The proposed approach for RF situation awareness in Frequency Hopping transponded SATCOM systems provide enhanced information support for DRA decision making in the system and lead to improved performance in complex RF environments.

Figure 9B:
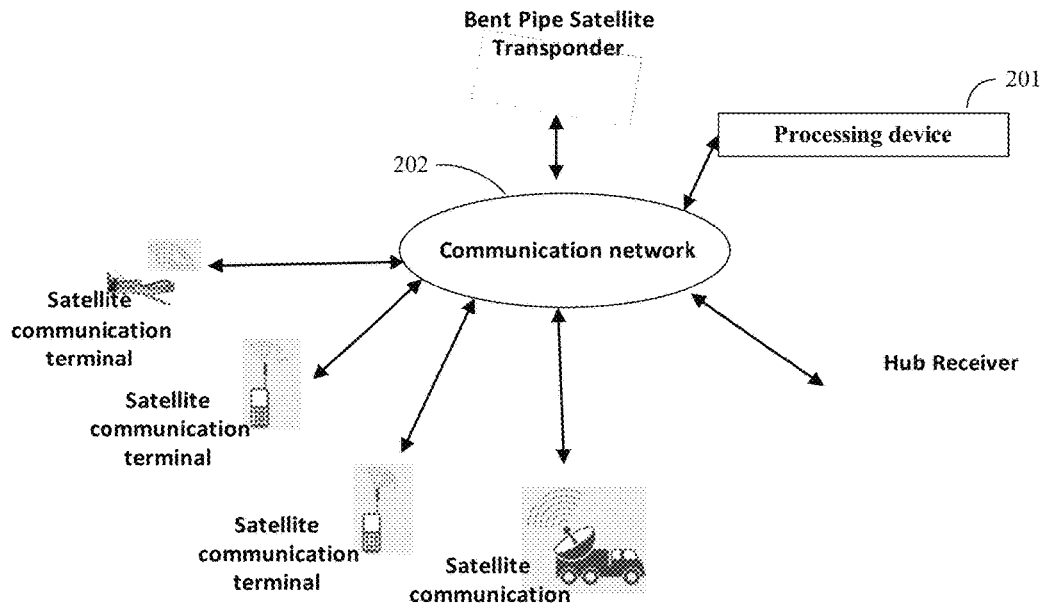
FIG. 9B illustrates a schematic block diagram of exemplary hardware of a processing device for signal fusion and inference with per-hop link quality measurements in frequency hopping satellite communication (SATCOM) systems in accordance with some embodiments of the present disclosure.

FIG. 9B illustrates a schematic block diagram of exemplary hardware of a processing device for fusion and inference with per-hop link quality measurements in frequency hopping satellite communication (SATCOM) systems in accordance with some embodiments of the present disclosure. The system includes a process device 201, which may at least include a hardware processor; and a memory storing instructions that, when executed by the hardware processor, cause the hardware processor to perform the schemed method disclosed in current disclosure. The processing device may communicate with other terminals through a communication network 202.

Figure 9C:
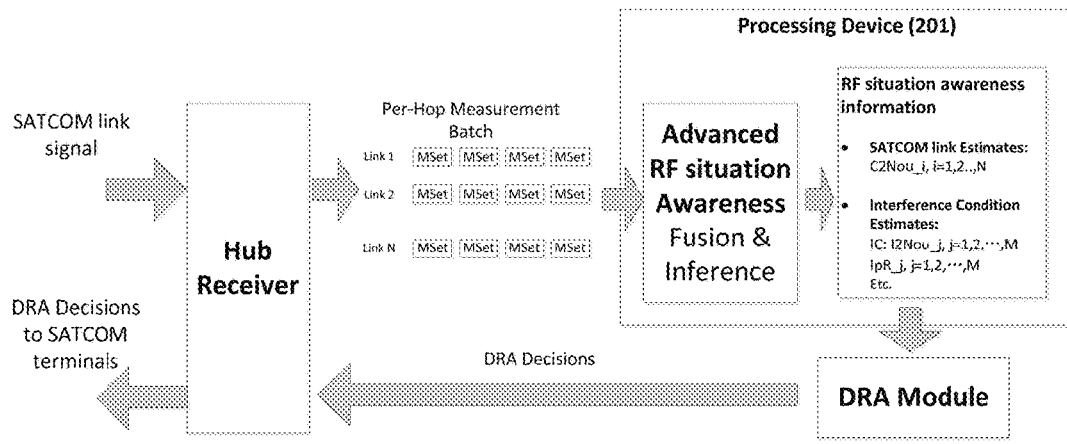
FIG. 9C illustrates a schematic block diagram of exemplary hardware of a processing device for fusion and inference with per-hop link quality measurements in frequency hopping satellite communication (SATCOM) systems in accordance with some embodiments of the present disclosure.

As shown in FIG. 9C, the processing device (201) receives per-hop measurement set for SATCOM links and conducts the disclosed grouping, fusion, and interference processing to derive RF situation awareness information on SATCOM links and interference conditions of the SATCOM system.

The processing device (201) provides the derived RF situation awareness information to a Dynamic Resource Allocation (DRA) module for the SATCOM system to make DRA decisions that control the SATCOM communication links.

Then the DRA decisions are distributed by the hub receiver to SATCOM terminals, such that the SATCOM link configurations are updated in the SATCOM system based on the DRA decisions.

In this disclosure, one of many methods of similar type of inference is available, such as the use of a Multi-Entity Bayesian Network (MEBN) to do the inference in order to derive distribution/estimates for various parameters of interest for a given interference condition IC: {Ae_1_1, Ae_2_m, Ae_3_n, Noh_IC*}. MEBN based inference is able to effectively handle the nonlinearity involved in the derivations and give accurate inference results.

Type I inference using MEBN for SATCOM RF situation awareness is proposed for the inference of key SATCOM link parameter's using measurements from the SATCOM hub receiver for the link. Typical link quality measurements include combined SNR level of the tranpsonded link, signal amplitude estimate at the hub receiver (denoted as Ae_i, where i is the link id, as well as combined noise level measured at the hub receiver (denoted as Noh_i). The measurements can be obtained using a maximum likelihood estimator (MLE) or other estimation algorithms of fused measurements such as Ae_i_1 as presented earlier. Note that for links passing through the same transponder amplifier at the same time Noh should be the same for the links as long as they are in hops with the same interference condition and there is no interference band overlapping with the signal band of a link, in such cases the fused noise level estimate Noh_IC*.

The objective of type I information fusion is to derive unknown parameters of the transponded link, in particular, the uplink carrier to noise power spectrum density ratio of the SATCOM links. For type I information fusion, the underlying assumption is that the combined noise at the hub receiver for the SATCOM links are contributed by only the uplink receiver noise and the downlink receiver noise, i.e., no external interference noise is in present in the signal spectrum band. For a given interference condition (corresponding to hops with the same total uplink interference strength I2Nou), such hops has the minimum level of noise level, i.e., Noh_IC*, for the SATCOM links.

The proposed type I information fusion for SATCOM RF situation awareness may apply to multiple links passing through the same TWTA at certain time period or periods. In a frequency hopping SATCOM system, the time period or periods corresponds to SATCOM hop or hops. Time periods that satisfy the assumption of type I information fusion can be identified by checking the measured combined noise levels at the hub for the SATCOM links. When the combined link noise level is low, there is no interference in present in the signal spectrum band, which corresponds to the fused noise estimate Noh_IC* for the Interference condition (IC).

FIG. 10 shows an example MEBN model for the type I information fusion for a SATCOM link group of two SATCOM links, i.e. H(1,3). Suppose the link condition is IC: (Ae_1_1, Ae_2_m, Noh_IC*), where Ae_1_1 and Ae_2_m represent the fused estimates of signal levels for link 1 and 2 under the interference condition (IC), and Noh_IC* represents the fused noise level for the interference condition.

As discussed earlier, estimates of Noh_IC*, Ae_1_1, and Ae_2_m are available from proposed the grouping and per-hop measurement fusion process. Estimates of Nod are also available from hub receiver local measurements. These estimates provide all the inputs needed for the type I inference.

In FIG. 10, node Nou_h(1,3,IC) is for the combined noise level at the hub receiver for the IC of link group H(1,2). Hence, $$Nou\_h(1,3,IC)=Noh(1,3)-Nod \qquad (5)$$

The MEBN is able to derive the distribution of Nou_h(1, 3,IC), using estimates Noh_IC* and Nod.

Nodes Pe_1_1 and Pe_2_m are the carrier power of the SATCOM link detected at the hub receiver for the two SATCOM links under the IC, which are a function of Ae_1_1, and Ae_2_m. The carrier power Pe is the square of the amplitude Ae multiplied by a constant determined by the symbol rate.

The MEBN is able to derive the estimates/distributions of Pe_1_1 and Pe_2_m using estimates Ae_1_1 and Ae_2_m as inputs.

Nodes C2Nou_1 and C2Nou_2 are for the uplink Carrier power to noise psd of link 1 and link 2 at the transponder receiver. Thus $$C2Nou\_i = [Pe\_i\_1]/[Nou\_h(1,2,IC)], i=1, 2 \quad (6)$$

Based on equation (4), estimates/distributions of C2Nou_1 and C2Nou_2 can be derived with the MEBN.

Node K(1,2,IC) is a ratio between hub receiver noise level, Nod, and the level of uplink noise measured at the hub receiver under the IC. One has $$K(1,2,IC) = Nou\_h(1,2,IC)/Nod \quad (7)$$

Using the MEBN, distribution of the ratio for the IC, e.g., K(1,2,IC) can be derived, which is also the ratio of uplink C2Nou_i and downlink C2Nod_i. It can then be used for the inference of uplink interference strength of the IC.

Important distributions derived from the type I MEBN include (a) C2Nou_i=1, 2, which are the uplink carrier power to noise density ratios of the SATCOM links belonging to the link group H(i, j . . . ), in this example, links 1 and 2; and (b) the mapping ratio, e.g., K(1,2,IC), between uplink SNR and downlink SNR under the interference condition (IC).

The proposed Type II inference for SATCOM RF situation awareness uses results from the type I information fusion to derive estimates of interference strength for given IC of a link group.

As shown in FIG. 11, input nodes for type II inference for an IC include: C2Nou_i, i=1, 2, . . . , and K(1,2,IC) which are from the type I information fusion results; input node C2Nod_Total are from local hub receiver estimates of the total downlink power to hub receiver noise psd, and C2Nou_No is the equivalent uplink noise power strength level from transponder receiver noise, which has the same value of the transponder amplifier bandwidth in Hz.

Node C2Nou_Total is the total uplink power to transponder receiver noise psd ratio, where the total power includes all uplink power from SATCOM links, interference, and receiver noises. One has $$C2Nou\_Total = C2Nod\_Total/K(1,2,IC) \quad (8)$$

With the distribution of K(1,2,IC) and C2Nod_Total available, the MEBN is able to derive the distribution and estimates for C2Nou_Total.

Node C2Nou(1,2) is the total SATCOM uplink power to transponder receiver psd ratio. In this example, one has $$C2Nou(1,2) = C2Nou\_1 + C2Nou\_2 \quad (9)$$

Since distributions/estimates of C2Nou_i , i=1, 2 are available, the MEBN in FIG. 11 is able to derive the distribution/estimates for C2Nou(1,3)

Node C2Nou(1,3,No) are the sum of the power to noise psd ratio of all SATCOM links in the link group e.g., H(1,2) in this case, and the equivalent transponder receiver noise power to noise psd ratio.

Finally, node I2Nou_IC is the uplink interference power to transponder receiver noise psd ratio under the IC of the link group. One has, in this case, $$I2Nou\_IC = C2Nou\_Total - C2Nou(1,2,No)$$

It can be seen that the distribution/estimate of I2Nou_IC can be obtained with the MEBN, since all the distributions of its parent nodes are available.

To summarize, the proposed type I and type II inference using MEBN is able to derive SATCOM link quality and interference strength under various interference conditions (IC) of a link group.

In accordance with various embodiments of the present disclosure, methods and systems for fusion and inference with per-hop link quality measurements in frequency hopping satellite communication (SATCOM) are provided.

In some embodiments, some portions of the various embodiments of the disclosed method and system, as well as some portions of architectures, functions and operations that can be implemented by computer program products. In this case, some blocks of the flow diagram or the block diagram may represent a module, a code segment, a portion of program code. Each module, each code segment, and each portion of program code can include one or more executable instructions for implementing predetermined logical functions.

It should also be noted that, each block in the block diagram and/or flow diagram, as well as the combinations of the blocks in the block diagrams and/or flow diagram, can be realized by a dedicated hardware-based system for executing specific functions, or can be realized by a dedicated system combined by hardware and computer instructions.

It should also be noted that, in some alternative implementations, the functions illustrated in the blocks be executed or performed in any order or sequence not limited to the order and sequence shown and described in the figures. For example, two consecutive blocks may actually be executed substantially simultaneously where appropriate or in parallel to reduce latency and processing times, or even be executed in a reverse order depending on the functionality involved in.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed present disclosure to the specific examples; rather, the examples are intended to illustrate only some of many possible aspects.

Accordingly, methods and systems for fusion and inference with per-hop link quality measurements in frequency hopping satellite communication (SATCOM) systems are provided.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure, which is only limited by the claims which follow. Features of the disclosed embodiments can be combined and rearranged in various ways. Without departing from the spirit and scope of the present disclosure, modifications, equivalents, or improvements to the present disclosure are understandable to those skilled in the art and are intended to be encompassed within the scope of the present disclosure.

What is claimed is:

1. A method for fusion and inference with per-hop link quality measurements in frequency hopping satellite communication (SATCOM) systems, comprising:
grouping hops having a same SATCOM link set into one hop group such that the one hop group contains a plurality of same SATCOM link sets, wherein each hop corresponds to one SATCOM link set, containing one or more SATCOM links, being active there-over;
measuring each SATCOM link to provide a measurement set, the measurement set including a signal amplitude measurement and a link noise level measurement;
grouping the measurement sets into one or more first measurement groups, based on a link identification, wherein each first measurement group includes a same link identification from different hops within a same hop group;
in the each first measurement group having the same link identification, further grouping the measurement sets having a same range of the signal amplitude measurements into one or more second measurement groups, wherein the signal amplitude measurements in the same range have a fused signal level measurement; and
obtaining interference conditions by associating second measurement groups of all links in each hop group based on hop identifications belonging to the second measurement groups, wherein the interference condition includes one second measurement group with a fused signal amplitude for each link corresponding to each hop group.

2. The method according to claim 1, further comprising:
for each interference condition, grouping the measurement sets having a same range of the link noise level measurement into one or more third measurement groups, and obtaining a fused noise level for each third measurement group.

3. The method according to claim 2, further comprising:
determining a noise floor estimate of the interference condition as a minimum fused noise level among third measurement groups of the interference condition.

4. The method according to claim 3, further comprising:
receiving, from hub receiver, hub receiver noise level estimate with an associated accuracy estimate.

5. The method according to claim 4, further comprising:
obtaining estimates of uplink carrier power to noise power spectrum density ratios of each link under the interference condition using the fused signal amplitude estimates of the second measurement group of a link of the interference condition, a noise floor estimate of the interference condition, and the hub receiver noise level estimate.

6. The method according to claim 5, further comprising:
receiving total downlink carrier power to noise power spectrum density ratios.

7. The method according to claim 6, further comprising:
obtaining interference strength estimate of the interference condition.

8. The method according to claim 1, further comprising:
counting a total number of hops associated with the interference condition; and
dividing the hops by the total number of hops to derive appearance rate of the interference condition.

9. The method according to claim 8, wherein:
the interference condition further includes the appearance rate of the interference condition.

10. The method according to claim 1, further comprising:
obtaining a rate of the SATCOM links encountering interference band under the interference condition.

11. The method according to claim 10, wherein:
the interference condition further includes the rate of the SATCOM links encountering interference band under the interference condition.

12. The method according to claim 1, wherein each of the measurement set further includes:
an associated measurement accuracy of the signal amplitude measurement, being a standard deviation of the signal amplitude measurement; and
an associated measurement accuracy of the link noise level measurement, being a standard deviation of the link noise level measurement.

13. A system for fusion and inference with per-hop link quality measurements in frequency hopping satellite communication (SATCOM) systems, the system comprising:
a hardware processor; and
a memory storing instructions that, when executed by the hardware processor, cause the hardware processor to:
group hops having a same SATCOM link set into one hop group such that the one hop group contains a plurality of same SATCOM link sets, wherein each hop corresponds to one SATCOM link set, containing one or more SATCOM links, being active there-over;
measure each SATCOM link to provide a measurement set, the measurement set including a signal amplitude measurement and a link noise level measurement;
group the measurement sets into one or more first measurement groups, based on a link identification, wherein each first measurement group includes a same link identification from different hops within a same hop group;
in the each first measurement group having the same link identification, further group the measurement sets having a same range of the signal amplitude measurements into one or more second measurement groups, wherein the signal amplitude measurements in the same range have a fused signal level measurement; and
obtain interference conditions by associating second measurement groups of all links in each hop group based on hop identifications belonging to the second measurement groups, wherein the interference condition includes one second measurement group with a fused signal amplitude for each link corresponding to each hop group.

14. The system according to claim 13, the memory storing instructions that, when executed by the hardware processor, further cause the hardware processor to:
for each interference condition, group the measurement sets having a same range of the link noise level measurement into one or more third measurement groups, and obtain a fused noise level for each third measurement group.

15. The system according to claim 14, the memory storing instructions that, when executed by the hardware processor, further cause the hardware processor to:
  determine a noise floor estimate of the interference condition as a minimum fused noise level among third measurement groups of the interference condition.

16. The system according to claim 15, the memory storing instructions that, when executed by the hardware processor, further cause the hardware processor to:
  receive, from hub receiver, hub receiver noise level estimate with an associated accuracy estimate.

17. The system according to claim 16, the memory storing instructions that, when executed by the hardware processor, further cause the hardware processor to:
  obtain estimates of uplink carrier power to noise power spectrum density ratios of each link under the interference condition using the fused signal amplitude estimates of the second measurement group of a link of the interference condition, a noise floor estimate of the interference condition, and the hub receiver noise level estimate.

18. The system according to claim 17, the memory storing instructions that, when executed by the hardware processor, further cause the hardware processor to:
  receive total downlink carrier power to noise power spectrum density ratios.

19. The system according to claim 18, the memory storing instructions that, when executed by the hardware processor, further cause the hardware processor to:
  obtain interference strength estimate of the interference condition.

20. The system according to claim 13, wherein each of the measurement set further includes:
  an associated measurement accuracy of the signal amplitude measurement, being a standard deviation of the signal amplitude measurement; and
  an associated measurement accuracy of the link noise level measurement, being a standard deviation of the link noise level measurement.

* * * * *